March 11, 1941.      R. F. WOLF      2,234,212
POLYVINYL CHLORIDE SOLUTION AND METHOD OF MAKING THE SAME
Filed March 2, 1939

Inventor
Ralph F. Wolf
By Willis F. Avery
Atty

Patented Mar. 11, 1941

2,234,212

UNITED STATES PATENT OFFICE 2,234,212

POLYVINYL CHLORIDE SOLUTION AND METHOD OF MAKING THE SAME

Ralph F. Wolf, Cuyahoga Falls, Ohio, assignor to The B. F. Goodrich Company, New York, N. Y., a corporation of New York Application March 2, 1939, Serial No. 259,340

4 Claims. (Cl. 260—32)

This invention relates to solutions of polyvinyl chlorides, and to a method of making the same.

It is well known that the solubility of polyvinyl chloride prepared by different methods varies considerably. This invention is concerned with the insoluble or gamma polymer of vinyl chloride. While hydrocarbon solvents in general do not dissolve gamma polyvinyl chloride at any temperature, it is known that chlorinated benzene and its homologues are solvents for gamma polyvinyl chloride at elevated temperatures. It has been found, however, that the gel point of such solutions is rather high which renders it impossible to deposit from solution films of gamma polyvinyl chloride either in a plasticized or an unplasticized form except at high temperatures. Thus the gel point of a 10% solution of gamma polyvinyl chloride in chlorbenzene is 73° C., in chlortoluene is 84° C., and in trichlorbenzene is 108° C. Not only are film-forming operations more expensive and troublesome at high temperatures, but polyvinyl chloride is not perfectly heat-stable and has a tendency to split off hydrogen chloride at elevated temperatures.

It is an object of this invention to provide a method of lowering the gel points of solutions of gamma polyvinyl chloride in chlorinated benzent and its homologues.

It is another object of this invention to provide improved solvents for gamma polyvinyl chloride.

Other objects will be apparent from the following description of the invention.

I have discovered that solvents containing furfuryl or tetrahydrofurfuryl groups tend, when mixed with chlorinated solvents, to markedly depress the gel points of the solutions. This invention accordingly contemplates the incorporation of a member of the class consisting of furfuryl alcohol, furfural, tetrahydrofurfuryl alcohol, and tetrahydrofurfural in chlorbenzene, trichlorbenzene, chlortoluene, and other homologues of chlorinated benzene.

Figure 2:
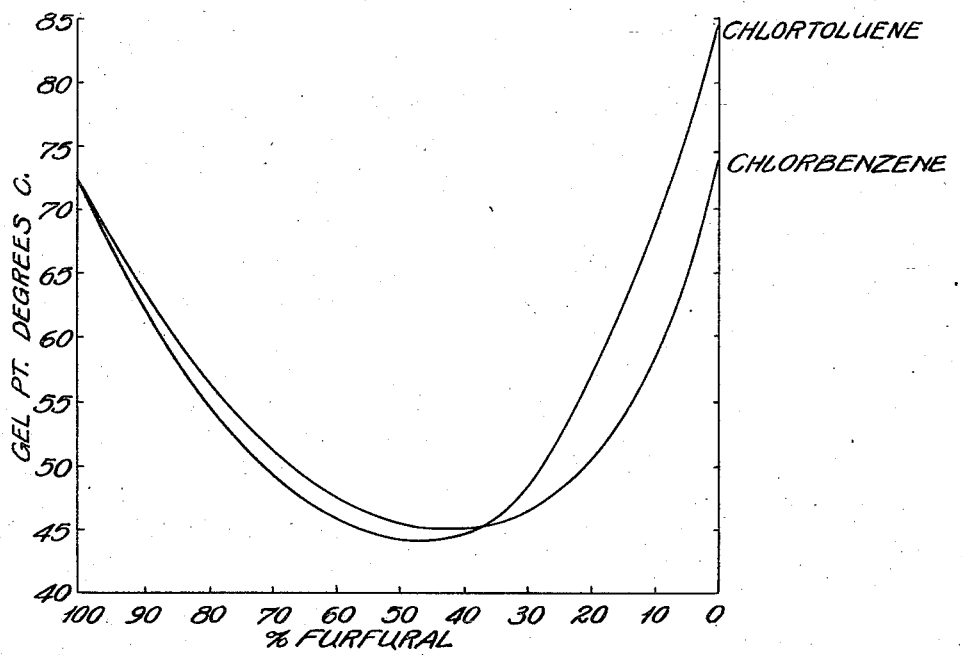
Figure 1:
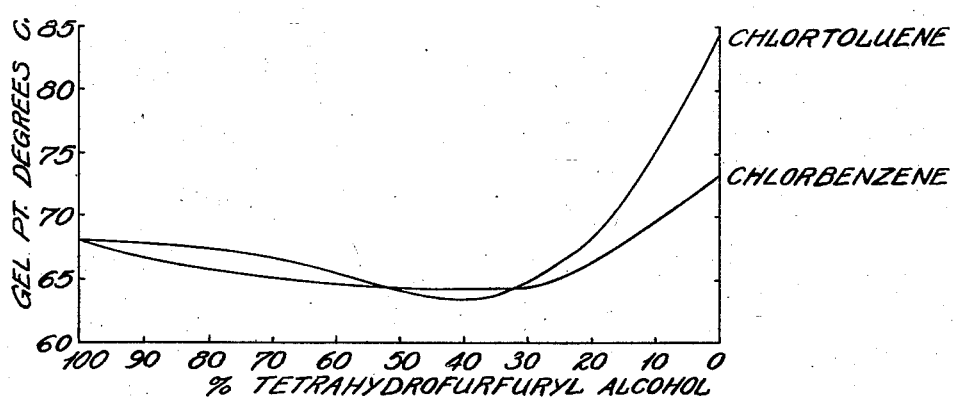

The invention may be better understood by referring to the accompanying drawing in which Fig. 1 represents the gel points of 10% gamma polyvinyl chloride solutions in mixtures of tetrahydrofurfuryl alcohol with both chlorbenzene and chlortoluene; and Fig. 2 represents the gel points of similar solutions in mixtures of furfural with both chlorbenzene and chlortoluene.

The gel points were obtained by dissolving 10 parts by weight of gamma polyvinyl chloride in 90 parts by weight of solvent by heating the components in a beaker in an oil bath. The solution was cooled with constant stirring until it gelled and would no longer flow from the bulb of the thermometer.

It can be seen in Fig. 1 that the gel points of solutions in which the chlortoluene contains 30–100% of tetrahydrofurfuryl alcohol are lowered even below the gel point of a solution of the gamma polymer in tetrahydrofurfuryl alcohol alone. It was found that from 20–100% of tetrahydrofurfuryl alcohol could be mixed with chlorbenzene, which alone gave a 10% solution having a gel point of 73, to produce solutions having gel points below 68° C.

As can be seen from Fig. 2, furfural, which alone gave a 10% solution having a gel point of 72, could be mixed with chlortoluene in proportions of from about 10–100% to give solutions having gel points under 72.

Furfural can be mixed with chlorbenzene in all proportions except very small ones to give solutions having gel points under 72.

By following the method of this invention, tetrahydrofurfural and furfuryl alcohol may be mixed in widely varying proportions with chlorinated benzene or its homologues to give solutions having lower gel points than those exhibited by solutions made with either solvent alone.

It is to be understood that this invention is applicable to gamma polyvinyl chloride in a plasticized or unplasticized state, and that the term "gamma polyvinyl chloride" is used in the claims to include plasticized compositions.

Although I have herein disclosed specific embodiments of my invention, I do not intend to limit myself solely thereto, for it will be obvious to those skilled in the art that many modifications thereof are within the spirit and scope of the invention as defined in the appended claims.

I claim:

1. The method of making a solution of gamma polyvinyl chloride which comprises dissolving gamma polyvinyl chloride in a mixed solvent containing a member of the class consisting of chlorinated benzene and its homologues and a member of the class consisting of furfuryl alcohol, furfural, tetrahydrofurfuryl alcohol, and tetrahydrofurfural in such proportions that the gel point is lower than the gel points obtained with either solvent alone.

2. A solution of gamma polyvinyl chloride in a mixed solvent containing a member of the class consisting of chlorinated benzene and its homologues and a member of the class consisting of furfuryl alcohol, furfural, tetrahydrofurfuryl alcohol, and tetrahydrofurfural, in such proportions that the gel point is lower than the gel points obtained with either solvent alone.

3. A solution of gamma polyvinyl chloride in a mixed solvent containing furfural and a member of the class consisting of chlorinated benzene and its homologues, in such proportions that the gel point is lower than the gel points obtained with either solvent alone.

4. A solution of gamma polyvinyl chloride in a mixed solvent containing tetrahydrofurfuryl alcohol and a member of the class consisting of chlorinated benzene and its homologues, in such proportions that the gel point is lower than the gel points obtained with either solvent alone.

RALPH F. WOLF.

CERTIFICATE OF CORRECTION.

Patent No. 2,234,212.  March 11, 1941.

RALPH F. WOLF.

It is hereby certified that error appears in the printed specification of the above numbered patent requiring correction as follows: Page 1, first column, line 29-30, for "benzent" read --benzene--; line 37, for "tetrahydrofurfural" read --tetrahydrofurfuryl--; and that the said Letters Patent should be read with this correction therein that the same may conform to the record of the case in the Patent Office.

Signed and sealed this 1st day of September, A. D. 1942.

(Seal)

Henry Van Arsdale,
Acting Commissioner of Patents.